| United States Patent [19] | [11] 3,957,498 |
| Reade | [45] May 18, 1976 |

[54] BORON-FREE SILVER HALIDE PHOTOCHROMIC GLASSES

[75] Inventor: Richard F. Reade, Corning, N.Y.

[73] Assignee: Corning Glass Works, Corning, N.Y.

[22] Filed: July 16, 1975

[21] Appl. No.: 596,433

[52] U.S. Cl. ............................... 106/52; 106/DIG. 6
[51] Int. Cl.² ......................... C03C 3/04; C03C 3/26
[58] Field of Search .......................... 106/52, DIG. 6

[56] References Cited
UNITED STATES PATENTS

| 3,653,863 | 4/1972 | Aranjo et al. | 106/DIG. 6 |
| 3,656,923 | 4/1972 | Garfinkel et al. | 106/DIG. 6 |

*Primary Examiner*—Winston A. Douglas
*Assistant Examiner*—Mark Bell
*Attorney, Agent, or Firm*—Kees van der Sterre; Clinton S. Janes, Jr.; Clarence R. Patty, Jr.

[57] ABSTRACT

Clear alkali aluminosilicate glasses free of boron but exhibiting good stability against copper and silver reduction, resistance to opalization, reduced temperature melting characteristics, and good photochromic properties after heat treatment are described. The use of $P_2O_5$ and $Li_2O$ in combination with fluorine in these compositions facilitates the manufacture of strongly photochromic glasses at reduced halide concentrations.

4 Claims, No Drawings

BORON-FREE SILVER HALIDE PHOTOCHROMIC GLASSES

BACKGROUND OF THE INVENTION

The present invention is in the field of photochromic glass and particularly relates to clear, essentially colorless boron-free photochromic glasses exhibiting improved stability and photochromic behavior.

U.S. Pat. No. 3,208,860 is the basic patent relating to silver halide-containing photochromic silicate glass compositions, and describes a large number of alkali borosilicate glasses exhibiting useful photochromic behavior. Initial attempts to reduce the boron content of these glasses were based upon a recognition of the fact that glasses containing large amounts of boron are not readily chemically strengthenable. Thus U.S. Pat. No. 3,656,923 discloses photochromic alkali aluminosilicate glasses wherein the boron content is minimized in order to provide materials which can be chemically strengthened by ion-exchange techniques.

It is difficult to totally eliminate $B_2O_3$ from photochromic alkali aluminosilicate glass compositions because boron has an important effect on the development of the photochromic silver halide crystallites, and also appears to inhibit the unwanted reduction of copper and/or silver which can lead to red or pink coloration of the glass. Thus many of the prior art compositions designed for ion exchange strengthening contained at least minor amounts of $B_2O_3$, not only to stabilize the glass, but more importantly, to prevent unwanted reduction and to insure the proper development of the photochromic silver halide phase.

Another problem encountered in the manufacture of photochromic aluminosilicates relates to the fact that relatively high melting temperatures must be employed, particularly when reduced quantities of fluxing materials such as fluorine and $Li_2O$ are utilized. Whereas glass stability may be improved by reducing the quantities of these added fluxes, halide volatilization is substantially increased due to the higher melting temperatures required, and photochromic performance is correspondingly degraded. The manufacture of bromine-containing glasses retaining significant quantities of silver chloride and bromide is particularly difficult when high melting temperatures are employed.

SUMMARY OF THE INVENTION

I have now discovered a region of alkali aluminosilicate glass composition wherein clear photochromic glasses exhibiting both good photochromic properties and good glass quality may be prepared. These compositions are essentially free of boron, yet may be melted at temperatures not exceeding about 1500°C. to provide colorless glasses of improved resistance to opal formation. These clear glasses are then heat treated to provide photochromic glasses exhibiting strong ultraviolet darkening and good room temperature fading.

The present compositions are based largely on the discovery that fluoride ion, either alone or in combination with $P_2O_5$, can act in alkali aluminosilicate glasses as an effective agent to initiate a phase separation leading to development of the photochromic silver halide phase. Moreover, the resulting photochromic glasses are both clear and colorless notwithstanding the absence of $B_2O_3$ and the presence of substantial quantities of fluorine.

Compositions within the scope of the invention consist essentially, in weight percent on the oxide basis, of about 45–56% $SiO_2$, 17–25% $Al_2O_3$, 4–14% $Na_2O$, 0–12% $K_2O$, 0–3.0% $Li_2O$, 13–21% total of $Li_2O + K_2O + Na_2O$, 0–7% ZnO, 0–6% $P_2O_5$, 1.5–9.5% F, 5–10% total of $P_2O_5$ + F, 0.2–1.5% Ag, 0.15–5.0% Cl, 0–1% Br, and 0.008–0.16% CuO.

These compositions contain lower quantities of silica and higher quantities of alkali metal oxides than prior art photochromic alkali aluminosilicate glasses. The presence of lithium oxide, while not essential, is desirable to reduce melting viscosity and to increase the chemical strengthenability thereof.

As noted, the presence of fluorine is required because fluoride ion helps to initiate the development of photochromic phases in the glass on heat treatment, and is effective as a flux in melting. However, the use of fluorine can present an effluent problem depending upon the melting method employed, and I have found that the quantity required can be substantially reduced by the addition of $P_2O_5$ to the composition. $P_2O_5$ also helps to initiate photochromic development, and the reduced fluorine levels attainable therewith permit the use of maximum amounts of $Li_2O$ without hazarding the development of opal phases in these glasses. This in turn reduces the melting temperatures required. Adequate photochromism and good melting behavior in these systems is insured by maintaining the total $P_2O_5$ + F content between about 5–10% by weight.

ZnO additions appear to be effective to reduce the tendency of these glasses to develop a non-photochromic NaCl opal phase.

The photochromic constituents Ag, Cl, Br and CuO may be incorporated in these compositions in amounts similar to those employed in prior art glasses. However, the reduced melting temperatures attainable with the present glasses substantially improve silver halide retention, so that equivalent or improved photochromic performance may be obtained even with reduced silver halide concentrations.

Glasses within the composition field hereinabove described may be provided from batches compounded of conventional glass batch constituents in proportions calculated to yield the specified oxides in the required amounts at the temperatures utilized for melting the batch. The batches may be melted in pots, tanks, crucibles or other suitable melting units at temperatures in the 1400°–1500°C. range within an interval of about 2–6 hours.

Molten batches of the described composition may be formed into glass articles by pressing, rolling, casting, or other conventional forming technique and, if desired, annealed at temperatures in the 300°–400°C. range following forming.

Glasses produced as above described are not photochromic as formed, but generally require a post-forming heat treatment to develop good photochromic response. Suitable heat treatments for this purpose comprise exposure of the glass to temperatures in the range of about 500°–675°C. for times in the range of about 1–6 hours. As with prior art glasses, the development process is both time and temperature dependent so that lower temperature treatments may require longer times, and vice versa. However the best heat treatment for any particular glass may readily be determined through routine experiment.

The photochromic properties of the heat treated glass are quite good, being characterized by substantial darkening under ultraviolet light, good fading characteristics, and most importantly, relative freedom from darkening by longer wavelength visible light. Hence, the present glasses do not exhibit significant darkening under conventional indoor incandescent or fluorescent lighting, in contrast to the behavior of some related alkali aluminosilicate photochromic glasses.

DETAILED DESCRIPTION

Specific examples of glass compositions which may be provided in accordance with the present invention are set forth in Table I below. The proportions of the constituents are reported in parts by weight on the oxide basis, except for silver and the halogens which are reported on an elemental basis in accordance with conventional practice.

Glass plates produced as described are cut, ground and polished to provide glass samples about 2 mm. in thickness, and are then heat treated at temperatures in the range of about 500°–675°C. for times in the range of about 1–6 hours to develop photochromic properties therein. Typical heat treatments which are employed to develop photochromic properties in these samples are set forth in Table II below, which reports heating rates, holding temperatures, holding times and cooling rates for each schedule. The cooling rate designated furnace rate corresponds to an average cooling rate of about 100°C. per hour down to at least about 100°C.

TABLE II

| Schedule | Heating Rate | Initial Hold Temperature | Holding Time | Second Hold Temperature | Holding Time | Cooling Rate |
|---|---|---|---|---|---|---|
| A | 500°C/hr. | 450°C. | 2 hours | 550°C. | ½ hour | furnace rate |
| B | 600°C/hr. | 550°C. | ½ hour | none | | furnace rate |
| C | 400°C/hr. | 400°C. | 4 hours | 500°C. | 2 hours | furnace rate |
| D | In at hold temperature | 550°C. | 1 hour | none | | furnace rate |
| E | In at hold temperature | 575°C. | 1 hour | none | | removed from furnace |
| F | 500°C/hr. | 525°C. | 1 hour | 600°C. | ½ hour | furnace rate |
| G | 300°C/hr. | 650°C. | 2 hours | none | | furnace rate |
| H | 300°C/hr. | 650°C. | 3 hours | none | | furnace rate |
| I | 300°C/hr. | 625°C. | 2 hours | none | | furnace rate |
| J | 500°C/hr. | 500°C. | 2 hours | 675°C. | 1 hour | furnace rate |

TABLE I

| Glass Compositions | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $SiO_2$ | 53.8 | 51.8 | 53.5 | 53.0 | 52.5 | 52.5 | 52.5 | 51.8 | 51.8 | 52.8 | 52.3 | 51.6 | 52.6 | 52.2 | 52.0 |
| $Al_2O_3$ | 21.5 | 20.7 | 20.5 | 20.3 | 20.1 | 20.1 | 20.1 | 19.8 | 19.8 | 20.2 | 20.8 | 19.7 | 20.1 | 19.2 | 19.9 |
| $Na_2O$ | 13.9 | 13.3 | 13.8 | 13.7 | 13.5 | 13.5 | 13.5 | 13.4 | 13.4 | 10.9 | 9.4 | 6.6 | 8.2 | 8.1 | 8.1 |
| $K_2O$ | — | — | — | — | — | — | — | — | — | 4.1 | 6.2 | 10.1 | 8.2 | 8.2 | 8.2 |
| ZnO | 2.2 | 2.1 | 3.7 | 3.6 | 3.6 | 3.6 | 3.6 | 3.5 | 3.5 | 3.6 | 2.1 | 3.6 | 3.5 | 3.5 | 3.5 |
| F | 7.1 | 9.3 | 7.0 | 8.0 | 8.9 | 8.9 | 8.9 | 8.8 | 8.8 | 7.0 | 7.9 | 6.8 | 5.9 | 6.9 | 6.9 |
| CuO | 0.04 | 0.04 | 0.04 | 0.04 | 0.04 | 0.04 | 0.04 | 0.04 | 0.05 | 0.04 | 0.04 | 0.04 | 0.04 | 0.04 | 0.04 |
| Ag | 0.29 | 0.28 | 0.29 | 0.29 | 0.19 | 0.29 | 0.28 | 0.28 | 0.28 | 0.28 | 0.28 | 0.28 | 0.28 | 0.28 | 0.27 |
| Cl | 1.3 | 2.5 | 1.3 | 1.3 | 1.3 | 1.3 | 1.3 | 2.5 | 2.5 | 1.3 | 1.3 | 1.2 | 1.9 | .92 | 1.2 |

| | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| $SiO_2$ | 51.9 | 51.8 | 51.4 | 55.3 | 55.0 | 46.3 | 47.2 | 47.0 | 47.0 | 45.6 | 46.7 | 46.7 | 46.7 | 46.7 |
| $Al_2O_3$ | 18.9 | 18.9 | 17.4 | 19.8 | 19.7 | 24.6 | 25.0 | 24.9 | 24.9 | 24.3 | 24.8 | 24.8 | 24.8 | 24.8 |
| $Na_2O$ | 8.0 | 8.0 | 7.8 | 4.7 | 4.7 | 6.0 | 6.1 | 6.0 | 6.0 | 7.6 | 6.0 | 6.0 | 6.0 | 6.0 |
| $K_2O$ | 8.2 | 8.2 | 8.1 | 7.2 | 7.2 | 9.0 | 9.2 | 9.2 | 9.2 | 11.6 | 9.0 | 9.2 | 9.2 | 9.2 |
| $Li_2O$ | — | — | — | 2.3 | 2.3 | 2.9 | 2.9 | 2.9 | 2.9 | 1.2 | 2.9 | 2.9 | 2.9 | 2.9 |
| ZnO | 5.0 | 5.0 | 7.0 | — | — | 3.2 | 3.2 | 3.2 | 3.2 | 3.1 | 3.2 | 3.2 | 3.2 | 3.2 |
| F | 6.8 | 6.8 | 6.8 | 3.1 | 3.1 | 3.3 | 1.7 | 1.7 | 1.7 | 1.6 | 2.2 | 2.2 | 2.2 | 2.2 |
| $P_2O_5$ | — | — | — | 5.2 | 5.2 | 4.0 | 4.1 | 4.1 | 4.1 | 4.0 | 4.1 | 4.1 | 4.1 | 4.1 |
| CuO | 0.04 | 0.04 | 0.04 | 0.04 | 0.04 | 0.04 | 0.04 | 0.04 | 0.04 | 0.04 | 0.04 | 0.04 | 0.04 | 0.02 |
| Ag | 0.28 | 0.28 | 0.28 | 0.30 | 0.30 | 0.32 | 0.32 | 0.32 | 0.32 | 0.31 | 0.31 | 0.32 | 0.32 | 0.32 |
| Cl | 0.92 | 1.2 | 1.2 | 2.0 | 2.6 | 0.34 | 0.35 | 0.69 | 0.18 | 0.25 | 0.17 | 0.26 | 0.20 | 0.20 |
| Br | — | — | — | — | — | — | — | — | 0.39 | 0.56 | 0.39 | 0.19 | 0.31 | 0.31 |

Compositions such as are set forth in Table I may be compounded of conventional glass batch constituents, and then melted in covered platinum crucibles at 1500°C. (1475°C. for compositions 19–29), maintaining the crucibles at this temperature for about 3–4 hours after the last batch additions thereto.

Glass plates are formed of the above melts by casting or by passinag the molten glass between two steel rollers about 0.25 inches apart to provide clear glass plates about 0.25 × 4 × 10 inches in size. These plates are transferred to an annealer operating at about 350°C., and annealed and slowly cooled to room temperature over a period of about 16 hours.

The photochromic properties of glass samples manufactured and heat treated as above described are measured in accordance with a procedure wherein the polished 2 mm. thick plates are first measured for visible light transmittance in the clear state, then measured for darkened transmittance after a 5-minute exposure of a pair of 15-watt blacklight-blue fluorescent lamps, exhibiting peak light emission at 3660 A, spaced 4 inches from the sample, and finally measured for faded transmittance after a 5-minute fading interval in the absence of light.

Table III below sets forth typical results of photochromic properties measurements taken on glass samples having compositions such as set forth in Table I, after heat treatment of those samples according to schedules such as set forth in Table II. Included in Table III are designations of glass-composition as reported in Table I, heat treatment as reported in Table II, the initial (clear) transmittance of each sample ($T_o$), the darkened transmittance of each sample after darkening as above described ($T_{d5}$), the transmittance of each darkened sample after a 5-minute fading interval in the absence of light ($T_{f5}$), the number of percentage points of darkening observed (D5), and the number of percentage points of fading observed (F5).

TABLE III

| Composition (Table I) | Photochromic Properties Heat-Treatment (Table II) | $T_o$ | $T_{d5}$ | $T_{f5}$ | D5 | F5 |
|---|---|---|---|---|---|---|
| 1 | A | 94 | 54 | 80.5 | 40 | 26.5 |
| 2 | A | 92 | 56 | 82 | 36 | 26 |
| 3 | A | 90 | 50 | 67 | 40 | 17 |
| 4 | A | 92.5 | 53 | 61 | 34.5 | 18 |
| 5 | A | 94.5 | 76 | 81 | 18.5 | 5 |
| 6 | B | 93 | 43 | 60.5 | 50 | 17.5 |
| 7 | A | 93.5 | 53.5 | 67 | 40 | 13.5 |
| 8 | A | 94 | 53.5 | 72 | 40.5 | 18.5 |
| 9 | A | 94 | 50.5 | 75 | 43.5 | 24.5 |
| 10 | B | 94 | 51.5 | 73.5 | 42.5 | 22 |
| 11 | A | 88 | 50.5 | 68 | 37.5 | 17.5 |
| 12 | B | 92.5 | 64 | 85 | 28.5 | 21 |
| 13 | B | 91 | 58 | 63 | 33 | 5 |
| 14 | B | 88 | 40 | 65 | 48 | 25 |
| 15 | B | 90 | 43 | 64.5 | 50 | 21.5 |
| 16 | B | 92 | 44 | 68 | 48 | 24 |
| 17 | B | 92.5 | 45 | 68 | 47.5 | 23 |
| 18 | B | 92 | 46 | 60 | 46 | 14 |
| 19 | C | 91.5 | 57 | 75.5 | 34.5 | 18.5 |
| 20 | D | 91 | 76 | 82.5 | 15 | 6.5 |
| 21 | E | 90.5 | 42.5 | 68 | 48 | 25.5 |
| 22 | F | 92 | 53 | 56 | 39 | 3 |
| 23 | F | 92 | 45 | 61.5 | 47 | 16.5 |
| 24 | G | 92 | 50.5 | 61 | 41.5 | 10.5 |
| 25 | G | 92 | 56 | 60 | 36 | 4 |
| 26 | H | 90 | 39 | 67 | 51 | 28 |
| 27 | H | 91.5 | 50 | 55 | 41.5 | 5 |
| 28 | J | 90.5 | 44.5 | 73.5 | 46 | 29 |
| 29 | I | 93 | 57 | 71.5 | 36 | 14.5 |

In general, all of the compositions reported above exhibit the combined properties of good metalbility, freedom from opal phases or colloidal silver, and good photochromic properties. However, superior melting characteristics are exhibited by glasses within the scope of the present invention, exemplified by compositions 19–29 of Table I, which include about 1–3% $Li_2O$, 1.5–5% F and 1–6% $P_2O_5$ by weight. Such compositions exhibit good stability against opal formation despite the presence of $Li_2O$, due to the relatively low fluorine concentrations employed. Moreover, they may be successfully melted at temperatures not exceeding 1475°C., because of the combined presence of $Li_2O$, $P_2O_5$ and F included therein. The production of photochromic glasses containing substantial amounts of bromine and/or utilizing low total silver halide concentrations is considerably simplified in these compositions due to the high halide retentions obtainable at lower melting temperatures.

Also preferred are compositions within the regions hereinabove described which contain 2–7% ZnO. As previously noted, this oxide is quite effective in suppressing non-photochromic opal phases such as NaCl.

The exclusion of $B_2O_3$ as well as certain of the alkaline earth metal oxides such as MgO and BaO from the present compositions is quite important in securing acceptable photochromic properties in accordance with the invention. This importance may be illustrated by substituting these oxides for other oxide constituents in a preferred composition such as composition 26 of Table I. For example, the substitution of $B_2O_3$ for all of the $P_2O_5$ in composition 26, on a cationic basis, produces a photochromic glass exhibiting substantial visible wavelength darkening, characterized by a dark gray coloration after a few hours of exposure to normal fluorescent lighting. Such a glass also exhibits only negligible room temperature fading in the absence of light. Similarly, the cationic substitution of MgO or BaO for the ZnO component of this composition also produces glasses exhibiting visible wavelength darkening and negligible fading, whereas the substitution of PbO for ZnO produces a non-photochromic glass. For this reason, the present compositions should be maintained essentially free of $B_2O_3$, MgO, BaO and PbO.

I claim:

1. An alkali aluminosilicate glass composition suitable for the production of photochromic glass articles consisting essentially, in weight percent on the oxide basis, of about 45–56% $SiO_2$, 17–25% $Al_2O_3$, 4–14% $Na_2O$, 0–12% $K_2O$, 0–3.0% $Li_2O$, 13–21% total of $Li_2O$ + $K_2O$ + $Na_2O$, 0–7% ZnO, 0–6% $P_2O_5$, 1.5–9.5% F, 5–10% total of $P_2O_5$ + F, 0.2–1.5% Ag, 0.15–5.0% Cl, 0–1% Br, and 0.008–0.16% CuO.

2. A glass composition in accordance with claim 1 which contains about 2–7% ZnO by weight.

3. A glass composition in accordance with claim 1 which contains about 1–3% $Li_2O$, 1.5–5% F, and 1–6% $P_2O_5$ by weight.

4. A glass composition in accordance with claim 3 which contains about 2–7% ZnO by weight.

* * * * *